March 19, 1968  T. R. DUNNAM  3,373,638
PIPE TONGS
Filed Jan. 6, 1967
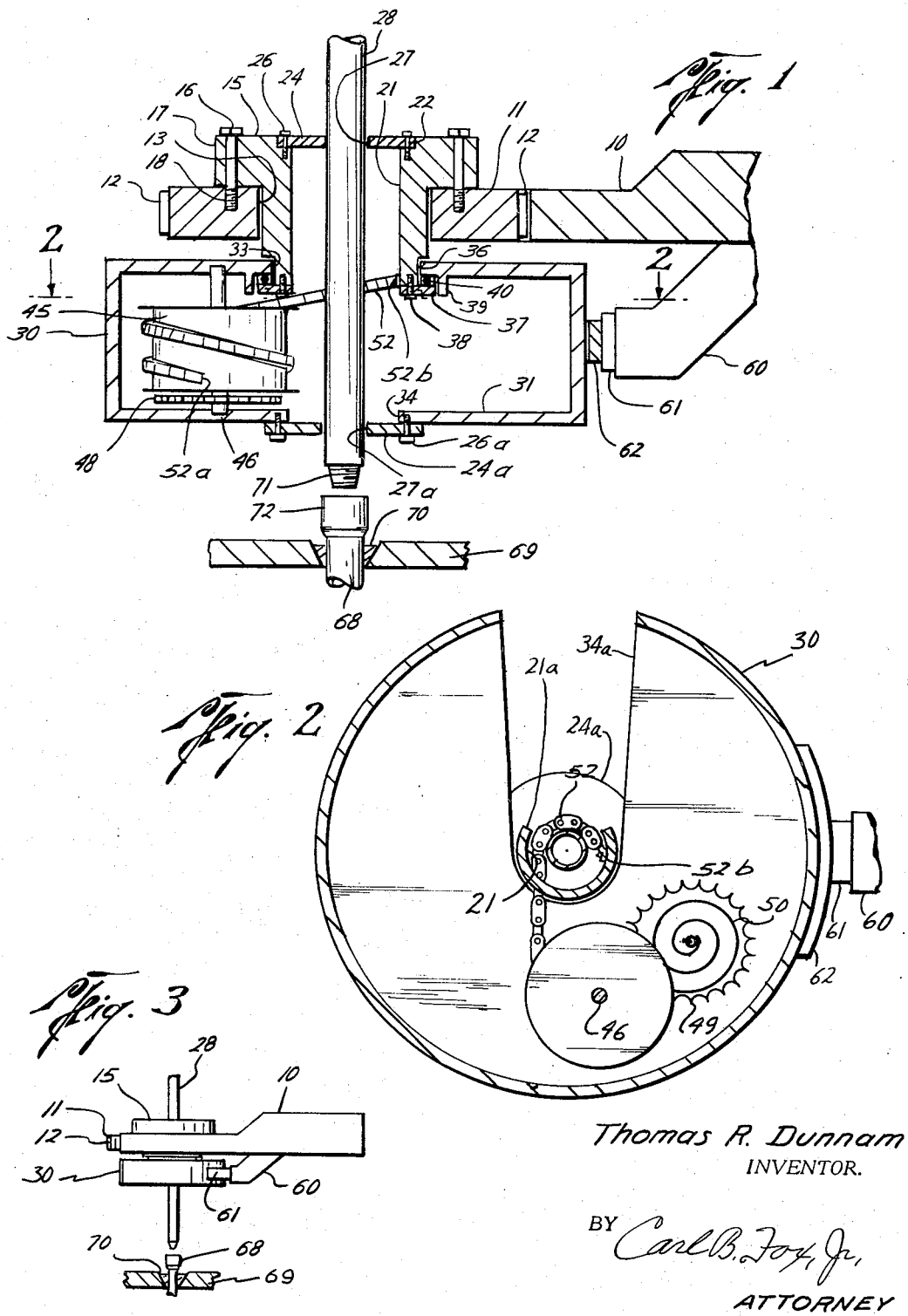
Thomas R. Dunnam
INVENTOR.
BY Carl B. Fox, Jr.
ATTORNEY

United States Patent Office 3,373,638
Patented Mar. 19, 1968

3,373,638
PIPE TONGS
Thomas R. Dunnam, 5870 Westover St.,
Houston, Tex. 77033
Filed Jan. 6, 1967, Ser. No. 607,783
5 Claims. (Cl. 81—57)

ABSTRACT OF THE DISCLOSURE

The disclosure of this application relates to pipe tongs which are adapted to securely grip a pipe disposed therethrough, yet which will not compress or bottleneck the pipe and which will result in a minimum of scarring of the exterior surface of the pipe. Pipe tongs are primarily used in making up and disconnecting threaded pipe connections of petroleum and other wells, but may have other uses.

Background of the invention

Pipe tongs are employed in oilfield practice for holding a pipe or string of pipe, and usually for rotating one of the pipes in order to thread or unthread it from the other string, which is held stationary. Most pipe tongs are provided with pipe gripping teeth, the teeth preventing slippage of the pipe in the tongs. The teeth are invariably at least somewhat sharp so that scarring and scratching of the exterior pipe surfaces results. This scarring and scratching of the exterior surface of the pipe at times results in eventual serious corrosion of the pipe, affecting its strength, appearance, and utility. Some pipe tong equipment includes various forms of jaws, usually in combination with toothed structures, which are employed in the manner described to hold the pipe during threading and unthreading of same with another joint of pipe. The principal object of this invention is to provide pipe tong apparatus which largely or completely eliminates scratching and scoring of the exterior pipe surfaces, thereby resulting in increased life of the pipe and freedom from eventual deterioration or destruction.

Summary of the invention

This invention pertains to pipe tong apparatus wherein an elongate chain, or cable, or the like, carried on a rotatable drum or spool, is held at one end by a rotating member which revolves about a pipe, the chain thus becoming helically wound about the pipe, so that the rotating member will be engaged with the pipe at the chain and thereby rotate the pipe in one direction or the other in order to make up or take apart a threaded pipe joint. The magnitude of gripping force of the pipe by the chain is determined by the longitudinal tension of the chain, which in turn is controlled by a rotatable housing to which a braking force is applied. The gripping of the pipe by the chain is very much like the manner of a ships' hawser gripping a capstan head, the tension applied by a sailor at one end of the hawser determining the gripping force.

Since chains have relatively smooth surfaces which will be against the pipe exteriors, very little if any scratching or scoring of the pipe exterior will result. At the same time, sufficient force may readily be applied so that the chain will adequately grip the pipe by proper tensioning of the chain.

After the pipe joint has been made up, or disconnected, the chain is released and rewound onto the chain spool by rotation of the chain spool by a spring. Therefore, the apparatus hereby afforded is automatically engaged about the pipe for the necessary turning action, and when the job is completed, the chain is released and is made ready for another job automatically.

Obviously, the apparatus may be adapted for pipe rotation in either direction so that it may be employed both for threading and unthreading of pipe joints.

Brief description of the drawings

FIG. 1 is a vertical cross-sectional view, partially schematic, taken at the pipe axis of the apparatus;

FIG. 2 is a horizontal cross-sectional view taken at line 2—2 of FIG. 1; and

FIG. 3 is a schematic showing of the overall apparatus of the type shown in FIGS. 1 and 2.

Referring now to the drawings in detail, the main body of the power tongs is indicated by reference numeral 10. The tongs have a turntable 11 which is driven by peripheral gear teeth 12 engaging a gear drive powered by an engine, not shown. This assembly of the tongs is conventional and any manner of providing a rotating turntable may be employed.

The turntable 11 has an opening or passage 13 vertically therethrough, passage 13 being of semicircular horizontal cross-sectional form, one side being open as indicated at 21a for insertion and removal of the pipe. A rotatable body 15 is secured to turntable 11 by a plurality of bolts or screws 16 disposed through holes through its upper flange part 17 and into tapped openings 18 of the turntable. Thus, body 15 rotates with the turntable. Body 15 has a coaxial semi-cylindrical opening 21 therethrough which is recessed at 22 around its upper end, and which is open at one side 21a for insertion and removal of the pipe. An interchangeable plate 24 is disposed in recess 22 and secured by screws 26. Plates 24 having different sized central openings 27 are provided to fit and centralize different sizes of pipe 28. In other words, if pipe 28 is larger, then opening 27 is correspondingly larger, and if pipe 28 is smaller, then opening 27 is smaller.

A body 30, sometimes herein referred to as the follower body, the body 15 being referred to at times as the powered body, is outwardly cylindrical, the axis being vertical, and is inwardly hollow, the interior chamber being referred to by reference numeral 31. Follower body 30 has an upper concentric opening 33 and a lower concentric opening 34, each of which is open at one side as at 34a for pipe entry and removal. These openings enable the pipe 28 to be received through the center of body 30. The lower reduced end 36 of body 15 is received through opening 33 and a plate 37 having a central opening of the same size as opening 21 is secured to the lower end of body 15 by screws 38. Integral ring 39 around opening 33 at the interior of body 30 serves to cover and centralize ring 37.

A plate 24a, which is identical with plate 24, has central opening 27a of a size suitable to receive and centralize pipe 28. Plate 24a is secured to body 30 by screws 26a. Bearings 40 are disposed between plate 37 and the upper web of body 30 so that body 30 and body 15 are mutually rotatable about their axes.

A chain drum or spool 45 is carried on a shaft 46 which is journaled to body 30 at its upper and lower ends as shown in the drawing. A gear 48 is fixed to shaft 46 and is engaged by gear 49 biased by spring 50 to rotate in a direction tending to rewind chain 52 helically around spool 45.

Brake device 60 carried beneath body 10 has brake shoes 61 and brake band 62, both of arcuate form, the brake band 62 being adapted to forcibly and controllably engage the exterior cylindrical surface of body 30, or to be released therefrom. When the brake is engaged with body 30, the rotation of body 39 is either controllably retarded or stopped. The lower end of chain 52 is fixed to spool 45 at 52a. The upper end of chain 52 is fixed at the interior of passage 21 at 52b. The chain may pass to either side of pipe 28, depending upon the direction of rotation of turntable 11 and body 15 to be employed, i.e.

whether the pipe joint is to be screwed together or released. A governor device may be employed to control rotation of body 30 instead of brake 60, if desired. The chain ends are fixed to lead out from the bottoms of the slots in bodies 15 and 30 so that the pull is such as to hold pipe 28 in the slots.

A second joint of pipe 68 is supported at well platform or table 69 by slips 70, or in other suitable manner at the well site. Pipe 68 is supported against rotation. Other pipe sections may be coupled with pipe 68 therebelow and extend downwardly into a well.

When a pipe 28 is to be screwed together with a pipe 68, the pipe 28 having a lower male thread formation 71 and the pipe 68 having an upper female threaded socket 72, the lower end of pipe 28 is disposed through the apparatus described, through passage 21, opening 33, and opening 34, with centralizer plates 24, 24a in place, and abutted into socket 72. Pipe 28 is usually rotatably supported by an elevator assembly. Then, with the chain end connected to body 15 at 52b, turntable 11 and body 15 are rotated, under the conditions shown in a clockwise direction viewed from the top, so that chain 52 is drawn around pipe 28 and drawn from around spool 45 which rotates until such time as the entire central portion of the chain has been wrapped helically around pipe 28.

During this time, body 30 does not rotate until the chain 52 is fully unwound from drum 45, the end of the chain, of course, being fixed to the drum. Thereafter, body 30 commences to rotate in the same direction as turntable 11, but rotation of body 30 is retarded by brake 60 acting on the periphery of body 30. The torque applied to the threaded connection by turntable 11 is the torque imparted to turntable 11 through gear 12 by the drive engine less the torque of brake 60 and the torque resistance of spring 50. The torques of the brake and spring determine the tension of the chain, and are made sufficient to prevent slippage of the chain on the pipe so that the pipe exterior does not become damaged. If the pipe is sufficiently loosely disposed, the pipe may rotate before the chain is completely unwound from drum 45. The torques employed might, for example, be: turntable 11, 2600 foot-pounds; spring 50, 30 foot-pounds; brake 60, 100 foot-pounds; the torque on the pipe then being 2470 foot-pounds.

After the pipe joint has been made up, rotation of turntable 11 is terminated. Then, the turntable is rotated in the opposite direction to enable spring 50 acting through gears 49, 48 to rewind chain 52 onto spool 45.

If the pipe joint is to be disassembled, the pipe 68 is again held by slips 70, or other suitable pipe holding means, and chain 52 is passed to the opposite side of pipe 28 and affixed to body 15 at the lower end of passage 21. Then the turntable is rotated in an unthreading direction, the chain upon completion of winding about the pipe again controlledly gripping the pipe and the chain exerting an unthreading twist upon pipe 28 to break and unscrew the pipe joint.

Since there are no teeth to grip the pipe in the described apparatus, there is no possibility of tooth marks upon the exterior of the pipe, or other damage thereto. Chain 52 has an inner surface which does not carry teeth or other sharp projections, but is, as is normal for chains, of relatively smooth formation. The high gripping force available with the apparatus is attributable to the tensioning of the chain, which is controllable, so that only so much gripping force by the chain as is required need be applied. The chain force at the exterior of the pipe is uniform and controlled and should always be sufficient such that slipping of the chain on the pipe does not occur. As has been indicated, the chain may be replaced by any suitable elongate means, such as a cable, rope, or the like.

While a preferred embodiment of the invention has been shown and described, many modifications thereof may be made by a person skilled in the art without departing from the spirit of the invention, and it is intended to protect by Letters Patent all forms of the invention falling within the scope of the following claims.

I claim:

1. Pipe tong apparatus, comprising first body means having an opening therethrough to receive a pipe, second body means disposed adjacent said first body means having an opening therethrough to receive a pipe, said openings of said first and second body means being aligned so that a said pipe may be received through both said openings simultaneously, said first and second body means each being rotatable about an axis lying along the axis of said pipe disposed through said openings thereof, means for rotating said first body means about said axis, releasable braking means for preventing rotation of said second body means about said axis, helically supported elongate means carried by said second body means and adapted to be unwound from one end from its said helical condition to extend to said body means openings, means biasing said elongate means toward its said helical condition, means for releasably fixing said one end of said elongate means at said opening of said first body means, means fixing the other end of said elongate means to said second body means, whereby when said one end of said elongate means is unwound and passed to one side of a pipe extending through said openings and fixed at said opening of said first body means rotation of said first body means in the direction in which said one end of said elongate means is passed about the pipe will cause complete unwinding of said elongate means from its said helical condition and helical winding of said elongate means about the pipe whereupon said elongate means will become tensioned between the fixed ends thereof to grip and rotate the pipe in the direction of rotation of said first body means, said releasable braking means controlling the degree of tensioning of said elongate means by controlling rotation of said second body means.

2. The combination of claim 1, said elongate means comprising chain means, said chain means being helically wound on spool means rotatably carried by said second body means, said biasing means comprising spring means biasing the rotation of said spool means to retain said chain means helically wound thereon.

3. The combination of claim 2, said second body means having a cylindrical surface concentric with said axis, said releasable braking means including brake band means adapted to adjustably and releasably bear against said surface.

4. The combination of claim 3, including means at said body means openings for maintaining a said pipe of any size insertable through said openings centered about said axis.

5. The combination of claim 4, including bearing means engaged between said first body means and said second body means supporting said second body means below said first body means, said bearing means permitting said described separate rotation of each of said first and second body means.

References Cited
UNITED STATES PATENTS

| | | | |
|---|---|---|---|
| 2,089,800 | 8/1937 | Jones | 81—54.11 X |
| 2,196,141 | 4/1940 | Davis et al. | 81—54.11 |
| 3,203,284 | 8/1965 | Norrick | 81—54.11 |

JAMES L. JONES, Jr., *Primary Examiner.*